May 25, 1943.  E. J. STODDARD ET AL  2,320,310
APPARATUS FOR INTEGRATING TIME AND TEMPERATURE
Filed Aug. 30, 1938    3 Sheets-Sheet 1
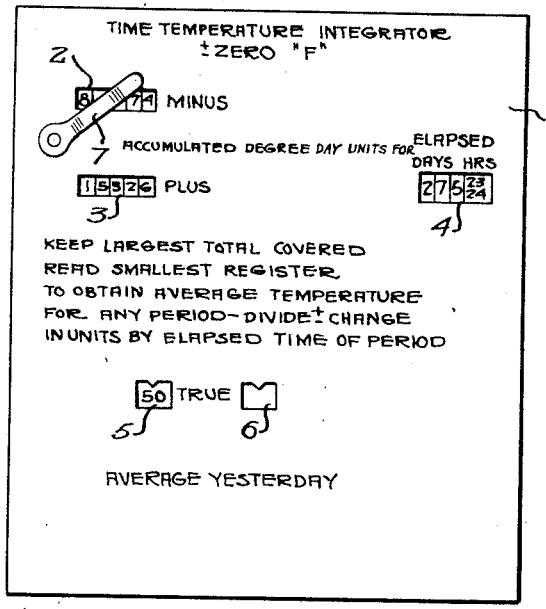
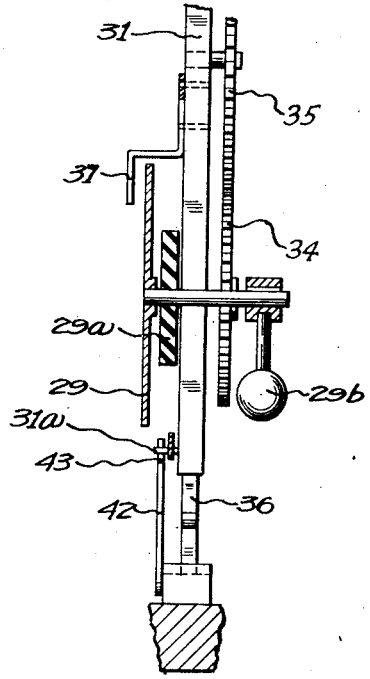
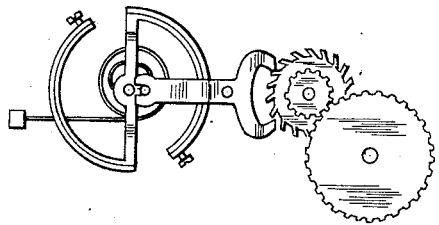
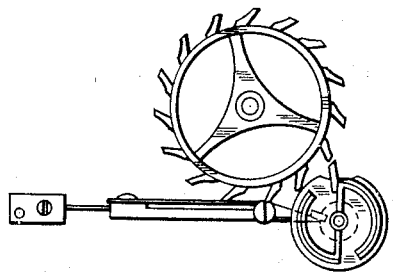
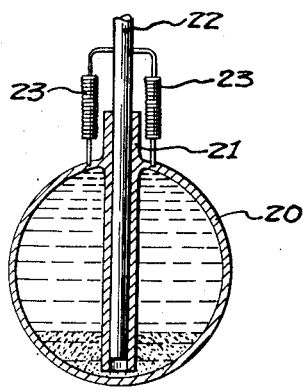

May 25, 1943.  E. J. STODDARD ET AL  2,320,310
APPARATUS FOR INTEGRATING TIME AND TEMPERATURE
Filed Aug. 30, 1938  3 Sheets—Sheet 3
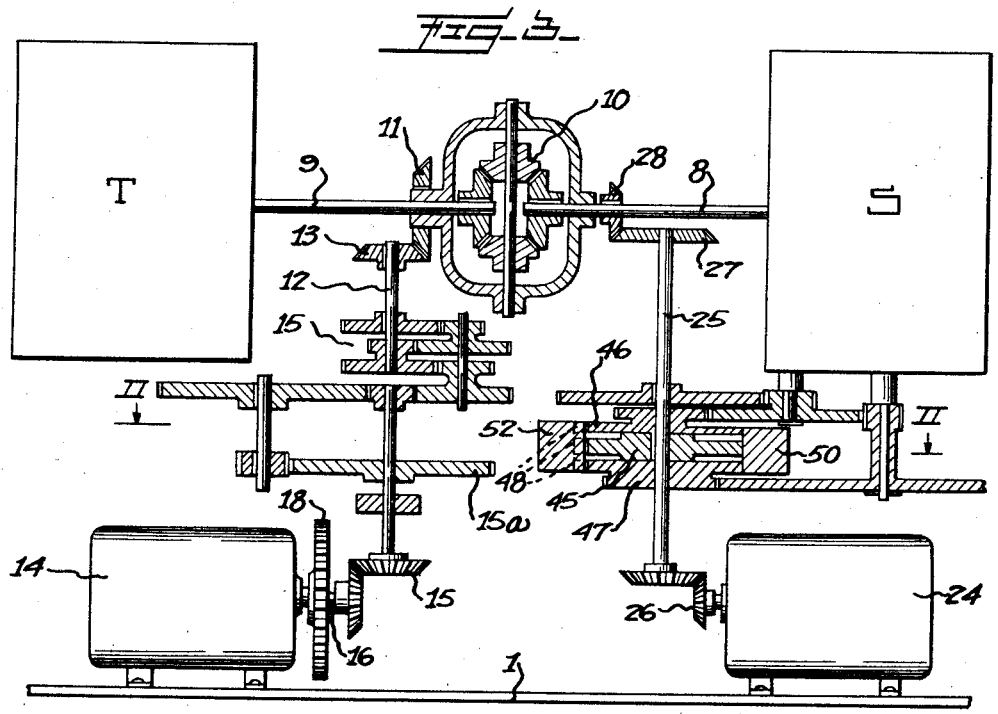
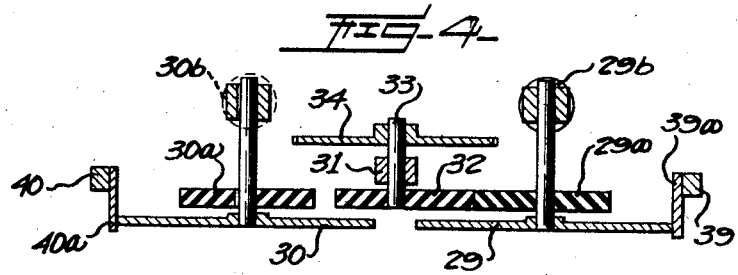
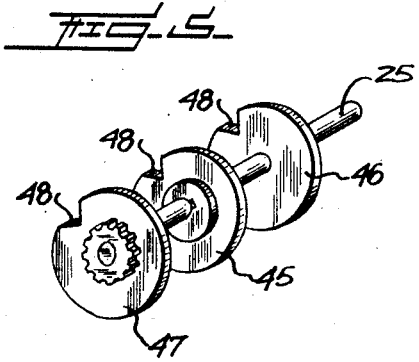
INVENTOR
Joseph W. Myers
Elliott J. Stoddard
BY
ATTORNEY Patented May 25, 1943

2,320,310

UNITED STATES PATENT OFFICE 2,320,310

APPARATUS FOR INTEGRATING TIME AND TEMPERATURE

Elliott J. Stoddard, Highland Park, Mich., and Joseph W. Myers, Philadelphia, Pa.; said Stoddard assignor to said Myers Application August 30, 1938, Serial No. 227,542

7 Claims. (Cl. 73—339)

Our invention relates to an apparatus for integrating time and temperature and an object is to measure and indicate the temperature that has obtained during a determined period of time.

We secure this object by the apparatus illustrated in the accompanying drawings, in which:

Figure 1 is a front elevation of an apparatus embodying our invention;

Figure 3, is not shown in this view;

Figure 3 is a section substantially in the plane indicated by the line III—III, Figure 2;

Figure 4 is a detail section in the plane indicated by the line IV—IV, Figure 2;

Figure 5 is a perspective illustrating a detail;

Figure 6 is a section on the line VI—VI, Figure 2;

Figure 7 is an escapement that may be used in said apparatus;

Figure 8 is a second form of escapement; and

Figure 9 is a pendulum that may be used.

Figure 2:
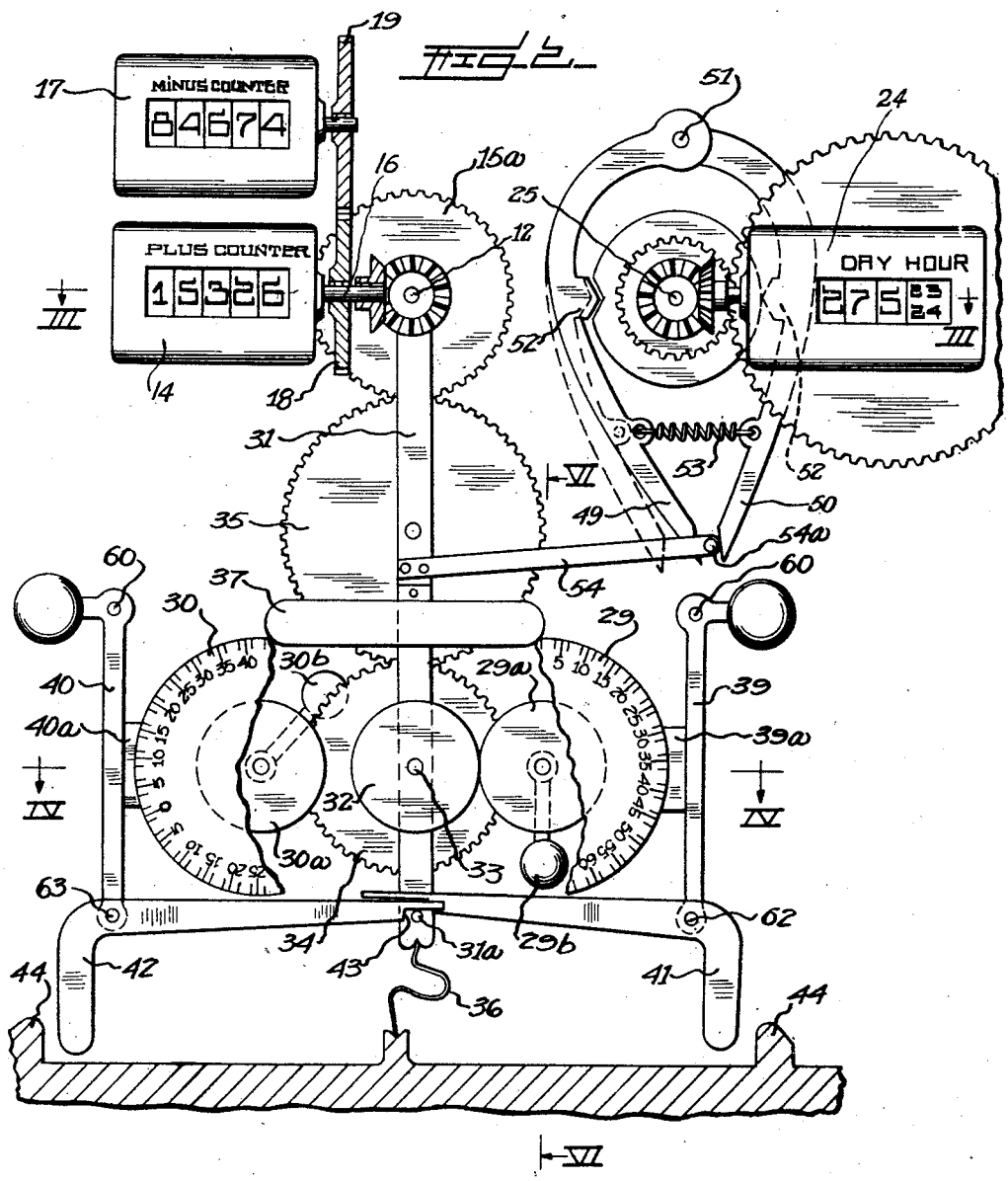
Figure 2 is an elevation, the front of the casing being removed. The apparatus back of the line II—II.

The drawings are somewhat diagrammatic especially in that some parts which are conventional and well known, such as journals, are omitted from the drawings for the sake of clearness.

I, Figure 1, is a casing having the observation openings 2, 3, 4, 5 and 6 through the face thereof. 7, is a pivoted arm which may be turned to cover the opening 2 or 3 as desired. The opening 2 is distinguished by the word "Minus"; 3 by the word "Plus"; 4 by "Elapsed days hrs."; and 5 and 6 by the legend "True average yesterday" to indicate the significance of the figures that appear through them. 2 and 3 are further described by the legend "Accumulated degree-day units for" referring to elapsed days and hours.

S (Figure 3) indicates a standard clockwork keeping the correct time, and T a clockwork in which a regulating member, for instance, the balance or pendulum, is made sensitive to heat so that it will cause the clockwork of which it forms a part to vary its rate of movement to a convenient predetermined extent as a function of the temperature.

8 is a shaft of the clockwork S, turning one revolution in twelve hours, and 9 is a corresponding shaft of the clockwork T, arranged axially in line with the shaft 8 and turning in the opposite direction at a rate that varies from that of the shaft 8 as the temperature varies from a datum point which may be taken as zero degrees Fahrenheit, that is to say, the shafts 8 and 9 turn at the same rate at 0 degrees F. but in opposite directions. Means of securing said variation will be hereinafter described in connection with Figures 7, 8 and 9.

10 is a differential mechanism between the shafts 8 and 9. 11 is a pinion keyed upon the casing of the differential 10 surrounding and coaxial with the shaft 9 of the clockwork T. 12 is a shaft extending at right angles to the shaft 9 and having a conical gear wheel 13 thereon engaging the bevel pinion 11.

14 is a conventional mechanical counter, the numbers of which may be seen through the opening 3 in the face of the casing I (Figure 1). 15—15, designates gearing between the wheel 13 and the shaft 16 of the counter 14, adapted to cause 144 revolutions of said shaft to one revolution of the pinion 11 and the casing of the differential 10.

17 (Figure 2) is a second mechanical counter located above the counter 14, and 18 and 19 are gear wheels connecting the shafts 16 of said counters so that they shall turn at the same rate but in opposite directions.

The numbers of the counter 17 appear through the opening 2 (Figure 1) in the face of the casing I.

In Figures 7 and 8 conventional escapement mechanisms are illustrated, but the rim of the balance is of thermostatic material arranged to increase or decrease the radius of gyration and therefore the rate of movement of the clockwork T from that indicating the correct time as the temperature varies from a datum point which may be taken as zero degrees Fahrenheit.

In Figure 9, a hollow pendulum 20 is shown having a cylindrical tube 21 extending through and above it and opening to the interior of said pendulum near its lower wall. The axial opening through said tube is very small and the suspension rod 22 of the pendulum fits and slides therein. There is a quantity of mercury in the pendulum 20 covering the lower end of the tube 21, and the rest of the interior of the pendulum is filled with alcohol.

If the cross-section of the suspension rod is so small that the weight of the pendulum will not be sustained by atmospheric pressure tension springs 23 may be interposed between the pendulum and suspension rod 22. The volume of the alcohol will vary with the temperature and this will cause the pendulum to slide up or down on the suspension rod 22. Of course this principle and construction may be used to vary the radius of gyration in the balance of the escapement. The object is to vary the rate, or speed, of the clock with the temperature, which may be in a direct proportion.

24 is a mechanical counter, the numbers of which appear through the opening 4 (Figure 1) in the face of the casing I. The counter 24 is actuated by the shaft 8, through a shaft 25 extending at right angles to the shaft 8 and gear wheels 26, 27 and 28 on said shafts which are so proportioned that the elapsed time will be indicated by the counter 24 in days and hours.

The variation of the temperature-sensitive clock from the actual time will be due to two factors: the difference in the rate of movement from the standard clock, which will depend upon the temperature; and, the time such difference has obtained. Both of these factors are integrated and indicated, as the aggregate difference between the two clockworks for a given period of time in the above described apparatus and, as the actual lapse of time is known the other factor may be known, and consequently the average temperature during said period.

One half revolution of the differential casing will occur when the temperature-sensitive clock has gained, or lost, 12 hrs. or 720 minutes referred to the standard clockwork.

We assume that the temperature-sensitive clockwork is so constructed that it will vary one minute per day for each degree of temperature, Fahrenheit, above or below zero. This, then, is the degree-day unit. Inasmuch as the shaft of the counter 14 turns 144 times at each revolution of the differential casing 10, and the counter is constructed to show ten numbers for each revolution of its shaft, one half revolution of the differential casing will cause the counters to indicate 720 units plus or minus.

The purpose of having the two counters 14 and 17 is to indicate negative degree-day units where the temperature has been more below zero than above, as, for example, in the arctic region or other cold localities. If the apparatus were started in such a locality with both counters at zero readings, the negative counter would start to accumulate minus degree-day units while the positive counter would be operating backward and would show large numbers, for example 99900, at which time the minus counter would show 100. The true reading is obviously on the counter with the smallest number; and since the counters read to five places, it is estimated that in any one year the smallest number would always be the correct reading.

29 and 30 (Figures 2 and 4) are discs upon parallel and spaced shafts. In Figure 2, these are broken away to show the apparatus behind them. Each of these discs is provided with a scale numbered from 50 below zero to 125 above, representing degree-day units. These discs are so located that the upper figures of their scales come before the openings 5 and 6 (Figure 1).

29a and 30a, are rubber friction wheels on the shafts of the discs 29 and 30. 29b and 30b, are weights secured to the ends of arms extending radially from the shafts of the discs 29 and 30 respectively, so that they shall cause said discs, when free, to turn to the position at which the zeros of their scales shall come opposite the openings 5 and 6 in the casing 1.

31 is a lever arm pivoted upon the shaft 12 at its upper end and normally extending vertically downward midway between the friction wheels 29a and 30a. 32 is a friction wheel on a shaft 33 bearing in the lever arm 31, so that said wheel shall engage the wheel 29a, or the wheel 30a, according as said lever arm shall swing to the right or left of its central position. 34 is a gear wheel on the shaft 33. 35 is a second gear wheel pivoted upon the lever arm 31 and engaging the gear wheels 34 and 15a and the shaft 12. 36 is a snap-over spring adapted to throw the lever arm to the right or left as it passes the center. 37 is a shield upon the lever arm 31, adopted to cover one of the openings 5 or 6 at the end of its travel and leave the other uncovered.

39 and 40 are bell crank-levers pivoted upon stationary supports 60; each lever having a weighted arm extending horizontally outward and an arm extending vertically downward and provided with a brake-shoe 39a or 40a adapted to engage the peripheries of the discs 29 and 30. 41 and 42 are levers pivoted at the lower ends of the downwardly extending arms of the levers 39 and 40, each having an arm extending horizontally inward and its outer and extending vertically downward. 31a is a pin extending horizontally outward from the lever arm 31 at its lower end. Each of the horizontal arms of the levers 41 and 42 is provided with a notch 43 at its lower edge and inner end extending outwardly and forming a shoulder at its outer end. The levers 41 and 42 rest with their horizontal arms upon the pin 31a. 44—44 are stationary lugs adapted to be engaged by the downwardly extending portions of the levers 41 and 42 to turn said levers about their pivots 62 and 63.

The lever arm 31 is shifted every 24 hours to cause the friction wheel 32 to engage the friction wheel 29a or 30a to rotate the disc 29 or 30, by means of the mechanism shown most distinctly in Figures 2 and 3.

The shaft 25 (Figures 3 and 5) is geared down at its inner end to rotate once in 48 hours and at its outer end is adapted to rotate the shaft of the counter 24 once in twenty-four hours. 45, is a disc keyed upon the shaft 25. 46, is a disc adapted to rotate upon the shaft 25 once in three hours, and 47 is a similar disc adapted to rotate about said shaft once in one hour. The gearing to secure this result is shown in Figure 3. In Figure 5, 48, 48, 48 indicate V-shaped notches, cut in the peripheries of the discs 45, 46 and 47, which come into alinement at points 180 degrees apart alternately every twenty-four hours. In Figure 2, 49 and 50 are lever arms pivoted at 51, extending downwardly on opposite sides of the series of discs 45, 46, and 47, each being provided with a lug 52 adapted to enter the notches 48, 48, 48, when said notches are in alinement, but excluded therefrom when any one of said notches is out of alinement with the others. 53, is a tension spring tending to draw the lower ends of the arms 49 and 50 together. 54, is a shifting rod secured at one end to the swinging arm 31, and at the other end provided with a pin 54a that is located between the lower ends of the arms 49 and 50. For a full and complete description of the construction and operation of the notched discs 45, 46 and 47 and their associated and cooperating mechanisms, attention is directed to the co-pending application of Joseph W. Myers, Serial No. 427,513 filed January 20, 1942.

The operation of the mechanism just described is, as follows:

In Figure 2 the notches 48 in the discs 45, 46, 47 have come into alinement at the left of said discs, admitting the lug 52 of the arm 49 into said alined notches. The spring 53 has drawn the arm 49 to the right carrying the rod 54 with it and thereby drawing the swinging arm 31 with it. As said arm passes its central position the snap-over spring 36 acts upon it to press the periphery of the wheel 32 against the periphery of the friction wheel 29a. The disc 29 will be driven by the gearing 15, 35, 34, 32 and 29a at such a rate that one unit of its scale will pass in front of the opening 6 as each degree-day unit is indicated by the counter 14.

The brake-shoes 39a and 40a are pressed against the peripheries of the discs 29 and 30 by their weighted levers 39 and 40 hard enough to prevent their automatic rotation by the weights 29b and 30b, but not hard enough to prevent the rotating of said discs by the friction wheel 32.

The disc 47 turning one revolution per hour, will now force the arm 49 outward to the position shown in broken lines in Figure 2, by the camlike action of the side of its notch 48 upon the face of the lug 52, thus tensioning the spring 53, and the discs 45, 46 and 47 will hold the arm 49 in this position until the notches again come into alinement at this place. When, after about twenty-four hours, the notches, 48, 48, 48 begin to come into alinement at the right hand side of the series of discs 45, 46 and 47, the lug 52 on the arm 50 will begin to enter said notches and said arm will be slowly drawn to the left by the spring 53, thus acting through the rod 54 to swing the arm 31 to the left. The pin 31a will engage the shoulder at the outer end of the notch 43 of the lever 42 to swing the lever 40 to the left carrying the brake-shoe 40a away from the periphery of the disc 30 and permitting the weight 30b to carry said disc back to the position in which the zero of its scale is opposite the opening 5 in the face of the casing 1. On the further movement of the lever arm 31, the vertical arm of the lever 42 contacts a stationary lug 44 which turns said lever about its pivot 63 and raises the shoulder of the slot 43 freeing the pin 31a and permitting the friction wheel 32 to pass into engagement with the friction wheel 30a, and the brakeshoe 40a to return into engagement with the periphery of the disc 30.

In the drawings it is assumed that the disc 30 has recorded 50 units for the previous day, which number is exposed through the opening 5 in the face of the casing 1. The shield 37 has uncovered the opening 5 and covered the opening 6 while the disc 29 is building up its indication for the then current day. When the arm 31 is shifted over so that the friction wheel 32 is pressed against the friction wheel 30a by the spring 36, the shield 37 is removed from before the opening 6, the disc 29 is held by the brake-shoe 39a, in the position the friction wheel 32 has left it at the end of the previous day and the indication for that day is exposed to view through the opening 6. Thus, while the indication for one day is being built up its indication is covered and the indication for the previous day is exposed to view.

We claim:

1. The combination of a clockwork having a normal rate, a clockwork adapted to have its rate varied with the temperature, and means actuated by said clockworks for indicating the difference in the movements of said clockworks said clockworks having the same rate of rotation at a certain datum point of temperature.

2. The combination of a clockwork having a normal rate, a clockwork adapted to have its rate vary with the temperature in a known way, said clockworks having similar shafts joined by a differential having a member adapted to turn in proportion to the difference in the rate of turning of said shafts, and means for indicating the movement of said member said clockworks having the same rate of rotation at a certain datum point of temperature.

3. The combination of a clockwork having a normal rate, a clockwork adapted to have its rate varied with the temperature in a known way, said clockworks having similar shafts joined by a differential having a member adapted to turn in proportion to the difference in the rate of turning of said shafts and a mechanical counter geared to said member said clockworks having the same rate of rotation at a certain datum point of temperature.

4. In combination, a first driving means having a constant rate of movement, a second driving means having the same rate of movement as said first driving means at a certain datum point of temperature but variable in response to variations in temperature and in proportion to such variations when the temperature varies from such datum point, a driven means operable by said two driving means in proportion to the differential movement of said two driving means, a totalizing registering means operated by said driven means, and an elapsed-time registering means driven by said first driving means.

5. In combination, a totalizing registering means, a first clockwork mechanism whose rate of movement varies in response to variations in temperature, a second clockwork whose rate of movement is substantially constant, said clockworks having the same rate of movement at a certain datum point of temperature, and means responsive to the conjoint operation of said clockworks for actuating said registering means only when the rate of movement of said first clockwork differs from the rate of movement of said second clockwork.

6. In combination, a first driving means having a constant rate of movement, a second driving means having the same rate of movement as said first driving means at a certain datum point of temperature but variable in response to variations in temperature and in proportion to such variations when the temperature varies from such datum point, a driven means operable by said two driving means in proportion to the differential movement of said two driving means, and a pair of totalizing registering devices operable by said driven means in opposite directions to indicate positive and negative integrated variations of said temperature from said datum point.

7. In combination, a first driving means having a constant rate of movement, a second driving means having the same rate of movement as said first driving means at a certain datum point of temperature but variable in response to variations in temperature and in proportion to such variations when the temperature varies from such datum point, a driven means operable by said two driving means in proportion to the differential movement of said two driving means, a pair of totalizing registering devices operable by said driven means in opposite directions to indicate positive and negative integrated units of variation of said temperature from said datum point, said devices being constructed and arranged to indicate at a glance the true reading by visual comparison of their respective readings, and an elapsed-time registering means driven by said first means, whereby the average deviation of said temperature from said datum point of temperature for any given period may readily be determined.

ELLIOTT J. STODDARD.
JOSEPH W. MYERS.